A. T. STURT.
AUTOMOBILE BODY.
APPLICATION FILED JUNE 4, 1919.
1,406,240.
Patented Feb. 14, 1922.
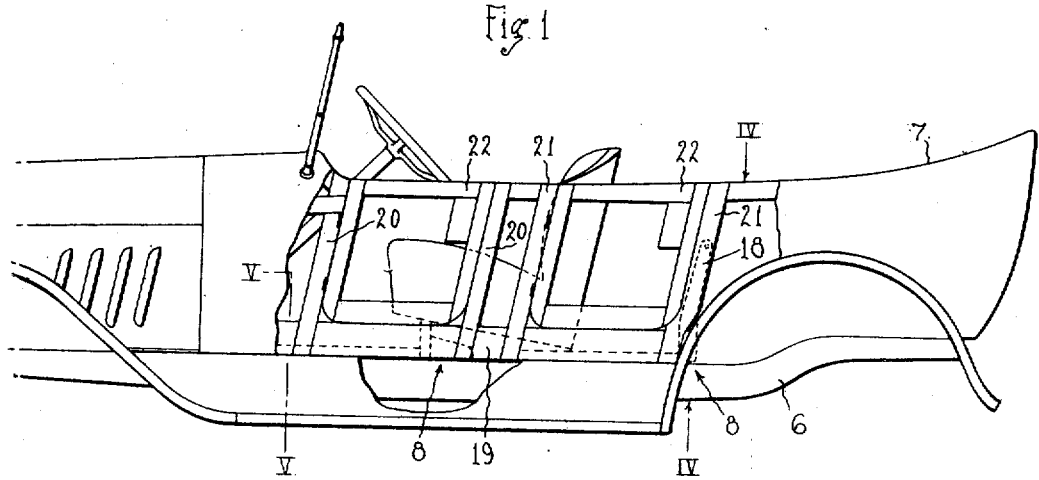
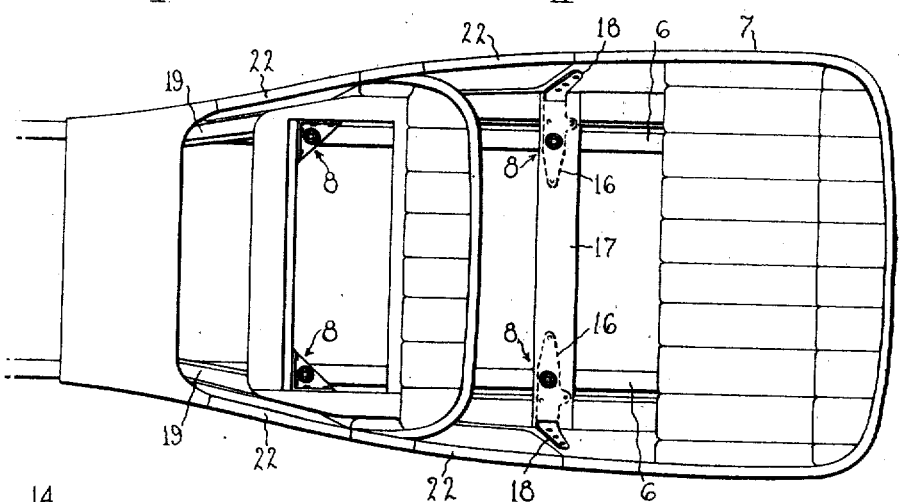
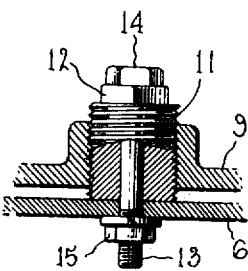
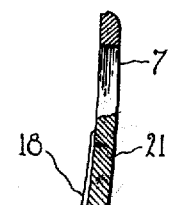
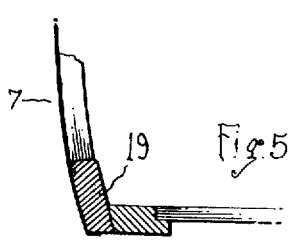
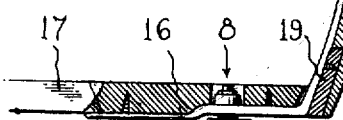
Inventor
Alfred T. Sturt
By his Attorney
Lloyd Blackmore ced devices
UNITED STATES PATENT OFFICE.

ALFRED T. STURT, OF NEW YORK, N. Y., ASSIGNOR TO GENERAL MOTORS CORPORATION, OF DETROIT, MICHIGAN, A CORPORATION OF DELAWARE.

AUTOMOBILE BODY.

1,406,240.  Specification of Letters Patent.  Patented Feb. 14, 1922.

Application filed June 4, 1919. Serial No. 301,708.

*To all whom it may concern:*

Be it known that I, ALFRED T. STURT, a citizen of the United States, and resident of New York city, New York County, State of New York, have invented certain new and useful Improvements in Automobile Bodies, of which the following is a specification.

My invention relates to various features in and associated with the bodies of automobiles and similar self-propelled vehicles, and particularly to means whereby the body is supported from the frame of the vehicle, to the arrangement of the door posts whereby the door openings are provided relative to said body supporting means, and to various other features in and connected with the bodies of automobiles and similar self-propelled vehicles, all as will hereinafter and at length appear.

The principal objects of my invention are to provide various improvements in and relating to means for supporting the vehicle body from the frame of the vehicle and to provide certain improvements in and relating to the location and arrangement of the door posts of the vehicle body relative to said body supporting means; the particular features of which several improvements are hereinafter described at length and particularly claimed in the concluding claims.

With the above and other objects of invention in view, my invention consists in the various improvements in and relating to the bodies of automobiles and similar vehicles hereinafter described and claimed.

The drawing accompanying and forming part of this specification illustrates the preferred embodiment of the various features wherein my invention consists; although it will be appreciated that my invention may be embodied in various other specific forms and that the same includes all such variations and modifications of the particular form thereof illustrated, within the scope of the concluding claims, as will naturally suggest themselves to those skilled in the art to which my invention relates.

Referring to the drawing:

Figure 1 is a view showing the body and frame of an automobile in side elevation, certain portions of the body being broken away to show features of construction otherwise hidden.

Figure 2 is a view showing the body in plan, and illustrating the manner in which the same is supported from the frame of the vehicle;

Figure 3 is a fragmentary detail view showing one of several supporting devices employed to support the body from the frame of the vehicle;

Figure 4 is a fragmentary view showing a section taken upon a substantially vertical transverse plane indicated by the line IV—IV of Figure 1; and, Figure 5 is a similar view taken upon a transverse plane indicated by the line V—V of Figure 1.

Referring to the drawing, the reference numerals 6 designate the side supporting frame members of an automobile chassis, the same extending longitudinally of the vehicle and being ordinarily connected together at their front and rear ends, although these details of construction are not illustrated in the drawing.

The reference numeral 7 designates the body portion of the vehicle, the same being supported from the frame members 6 and the form thereof illustrated in the drawing being provided with front and rear seats, although the distinguishing features wherein my invention consists, regarded in their broader aspects, are quite independent of the number of seats with which the body is provided, as well as of the particular shape, outline, or purpose thereof.

The body 7 is supported from the frame members 6 at a plurality of points separate from one another and spaced along the frame, the vehicle body illustrated being supported at four points 8, although six or more points of support may be provided between the frame and the vehicle body in the larger sizes of vehicles or bodies.

The body is supported from the frame through and by means of supporting devices shown in two different forms in Figures 3 and 4, and which devices comprise a body supporting bracket 9 secured to the framework of the body adjacent the under side thereof, and which brackets are each provided with a vertical or substantially vertical threaded opening within which an exteriorly threaded supporting member 11 is located; and which supporting member is obviously adjustable, vertically, within the opening within which it is located, as by rotating the said member about its axis, the upper end thereof being squared as shown at 12 to facilitate the rotation of the said member within the opening in the bracket 9. The lower ends of the several supporting members 11 rest upon the upper sides of the channel iron frame members 6, from which it follows that the body of the vehicle is supported from the said frame members only at the points at which said supporting members rest upon the upper surfaces of the frame members.

This supporting of the body of the vehicle at separate points eliminates squeaking due to relative movement between the sills of the body and the frame members, and caused by a sliding movement between the sills and the frame members as the frame bends due to unevenness in the ground over which the vehicle is passing, as no portion of the under side of the body is in direct contact with the frame when the supporting members are properly positioned.

It will furthermore be appreciated that by properly adjusting the threaded supporting members within the openings in the brackets the said members may be so positioned as to secure a substantially equal distribution of the weight of the body between the several points of support, and furthermore, the adjustment provided for by the rotation of the supporting members enables the vehicle body to be spaced slightly from the frame so that the deflections of portions of the frame between the points of support, due to unevenness in the roadway, will not bring the portions of the frame between the points of support into contact with the sills of the body. The feature of adjustability provided by the supporting members also enables the body to be so adjusted as to secure a proper operation of the doors without binding in the openings provided for them, which is a further feature of advantage incident to the use of supporting members of the kind employed in my invention.

In order to anchor the body as a whole securely to the frame of the vehicle after it has been properly adjusted by means of the rotatable supporting members 11, suitable means are provided for fastening the said supporting members directly to the frame of the vehicle at the several points of support. In the embodiment of my invention illustrated the securing of the body to the frame at the points of support is provided for by vertically extending passages in the said supporting members, said passages being concentric with the axes of rotation of the said members and through which passages bolts 13 extend, the heads 14 of the bolts being shown as lying above the squared upper ends of the supporting members and the nuts 15 thereof being shown as beneath the upper portions of the supporting frame members 6, although it will be appreciated that the location of the heads and nuts may be reversed. The bolts 13 pass through holes provided in the upper heads of the channel frame member 6, to thereby hold the supporting members and body to the frame, as clearly shown in Figures 3 and 4 of the drawing.

In the form of supporting means shown in Figure 3 the bracket in which the vertically extending opening is provided is designed primarily for the purpose of affording support for the supporting member 11, although of course it incidentally strengthens the corner of the frame in which it is secured. In the form of my invention shown in Figure 4, however, the bracket is provided with an elongated horizontal portion 16 extending along a cross-sill 17, and with a vertically extending portion 18 extending upwardly along one of the door posts to be hereinafter referred to and secured thereto, to thereby strengthen the body at the point where the said bracket is located, as well as to provide a support for the threaded supporting member 11 associated with the said bracket.

Referring now particularly to Figure 1, the reference numeral 19 designates one of the supporting sills of the body portion, the same extending longitudinally thereof and of the frame members 6 of the vehicle; and the reference numerals 20, 20 and 21, 21 designate two pairs of door posts extending upwardly from the sills 19 and the lower ends of which are secured to the said sills. These door posts are spaced apart from one another to thereby provide door openings to be closed by the doors 22 of the body; and said posts are substantially parallel, and are inclined rearwardly relative to a vertical line extending through the point of connection between their lower ends and the sill 19.

This inclining of the door posts relative to a vertical line extending through their points of attachment to the sills provides a wider passageway into the body of the vehicle just to the rear of the front seat, and back of the steering wheel, than would be secured if the door posts were vertical; and, furthermore, provides a plan of body construction in which the lower ends of the rear door posts may be secured directly to the longitudinal sills of the vehicle; whereas if the rear door posts were vertical their lower ends would have to be secured to framing extending over the rear wheels and axle in order to secure sufficient width of opening between their upper ends and the back of the front seat, which is a construction deficient in stiffness, as well as one materially more expensive than a construction in which the rear door posts are carried by and secured to the side sills of the body.

It will be seen that the inclination of the door posts corresponds approximately with the inclination of the seat backs, so that, for example, when a rear door is opened an entrance passageway is provided between the rear door posts and the back of the front seat of substantially uniform width from top to bottom and through which a person may enter the body more easily and with less interference than would be the case if the rear door posts were vertical, and the lower end of the rear one of said posts secured to the sill 19 in front of the rear wheel bridge frame or housing.

The inclination of the front door posts rearward also provides a wide entrance opening past the steering wheel, and such posts being substantially parallel with the back of the front seat also enables the operator to enter the vehicle more readily than would be the case if the door posts in question were vertical, as has usually been the case.

My invention contemplates the arrangement of the body sills 19 edgewise, as best shown in Figures 1, 4 and 5, or, as otherwise stated, the vertical dimension or height of said sills is much greater than their horizontal dimension or thickness. This arrangement of the sills provides a stiffer construction of body than would be the case if they were arranged flatwise; and, moreover, provides a sill construction in which a stronger joint is secured between the lower ends of the door posts and the sills, because of the greater vertical dimension or height of the joint between the lower ends of the posts and the sills in question.

Having thus described and explained my invention, I claim and desire to secure by Letters Patent:

1. In an automobile, the combination with a frame member, and a body supported therefrom, of a body supporting bracket carried by said body and having a threaded opening; a threaded supporting member the lower end of which rests upon and is supported by said frame member and the threads of which member engage with the threads of the opening aforesaid, and which supporting member is rotatable about a vertical or substantially vertical axis; and means for securing said supporting member to said frame.

2. In an automobile, the combination with a frame member, and a body supported therefrom, of a body supporting bracket carried by said body and having a threaded opening; a threaded supporting member the lower end of which rests upon and is supported by said frame member and the threads of which member engage with the threads of the opening aforesaid, and which supporting member is rotatable about a vertical or substantially vertical axis; and a fastening bolt extending through a passage provided in said supporting member and through a hole in said frame member, and whereby the body is secured to the frame member.

3. In combination, a body supporting bracket having a threaded opening; and a rotatable threaded supporting member located within and the threads of which are in engagement with the threads of said opening, said supporting member having a passage concentric with its axis of rotation and through which a securing bolt may extend.

4. In an automobile body, a longitudinally extending supporting sill; a cross sill; an upwardly extending door post; a support-bracket having a horizontal arm secured to said cross sill, an upwardly extending arm secured to said door post, and a threaded opening located in said horizontal arm; a rotatable threaded supporting member located within and the threads of which are in engagement with the threads of said opening; and means whereby said supporting member may be secured to a suitable support.

5. In an automobile body, a longitudinally extending supporting sill; a cross sill; an upwardly extending door post; a supporting bracket having a horizontal arm secured to said cross sill, an upwardly extending arm secured to said door post, and a threaded opening located in said horizontal arm; and a rotatable threaded supporting member located within and the threads of which are in engagement with the threads of said opening, said supporting member having a passage concentric with its axis of rotation and through which a securing bolt may extend.

In testimony whereof I affix my signature.
ALFRED T. STURT.